US009682653B2

(12) United States Patent
Oh et al.

(10) Patent No.: US 9,682,653 B2
(45) Date of Patent: Jun. 20, 2017

(54) VEHICLE AND METHOD FOR CONTROLLING THE SAME

(71) Applicant: Hyundai Motor Company, Seoul (KR)

(72) Inventors: Youngchul Oh, Seongnam-si (KR);
Kicheol Shin, Seongnam-si (KR);
Byungyong You, Suwon-si (KR);
MyungSeon Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/950,551

(22) Filed: Nov. 24, 2015

(65) Prior Publication Data

US 2017/0057410 A1    Mar. 2, 2017

(30) Foreign Application Priority Data

Aug. 31, 2015    (KR) .................. 10-2015-0123001

(51) Int. Cl.
*B60Q 9/00* (2006.01)
*G07C 5/02* (2006.01)
*B60R 1/00* (2006.01)
*G05D 1/00* (2006.01)

(52) U.S. Cl.
CPC .................. *B60Q 9/00* (2013.01); *B60R 1/00* (2013.01); *G05D 1/0088* (2013.01); *G07C 5/02* (2013.01); *B60R 2300/8086* (2013.01)

(58) Field of Classification Search
CPC ........... B60Q 9/00; B60R 1/00; G05D 1/0088
See application file for complete search history.

(56) References Cited

U.S. PATENT DOCUMENTS

2010/0228419 A1* 9/2010 Lee .................. B60W 30/0953
701/25

FOREIGN PATENT DOCUMENTS

| JP | H0569757 A | 3/1993 |
|---|---|---|
| JP | H0911772 A | 1/1997 |
| JP | 2004220348 A | 8/2004 |
| JP | 2005178622 A | 7/2005 |
| JP | 2006248393 A | 9/2006 |
| JP | 2007137148 A | 6/2007 |
| JP | 2010271750 A | 12/2010 |
| KR | 10-0437208 B1 | 8/2001 |
| KR | 100820436 B1 | 4/2008 |

* cited by examiner

*Primary Examiner* — Leon Flores
(74) *Attorney, Agent, or Firm* — Brinks Gilson & Lione

(57) ABSTRACT

Forms of the present disclosure provide vehicles and methods for controlling the same, which detect abnormal driving and notify the driver of the abnormal driving, and increase a distance to a car ahead or avoid the car ahead in the abnormal driving. A vehicle includes a sensor for obtaining information regarding surroundings of the vehicle, a processor for determining an error between lines and a traveling trajectory of a car ahead, and a change in acceleration of the car ahead, based on the information obtained by the sensor, and determining whether the car ahead is being driven abnormally based on the error and change of acceleration, and a display for displaying a message indicating that the car ahead is being driven abnormally.

17 Claims, 5 Drawing Sheets

NORMAL DRIVING
(a)

ABNORMAL DRIVING
(b)

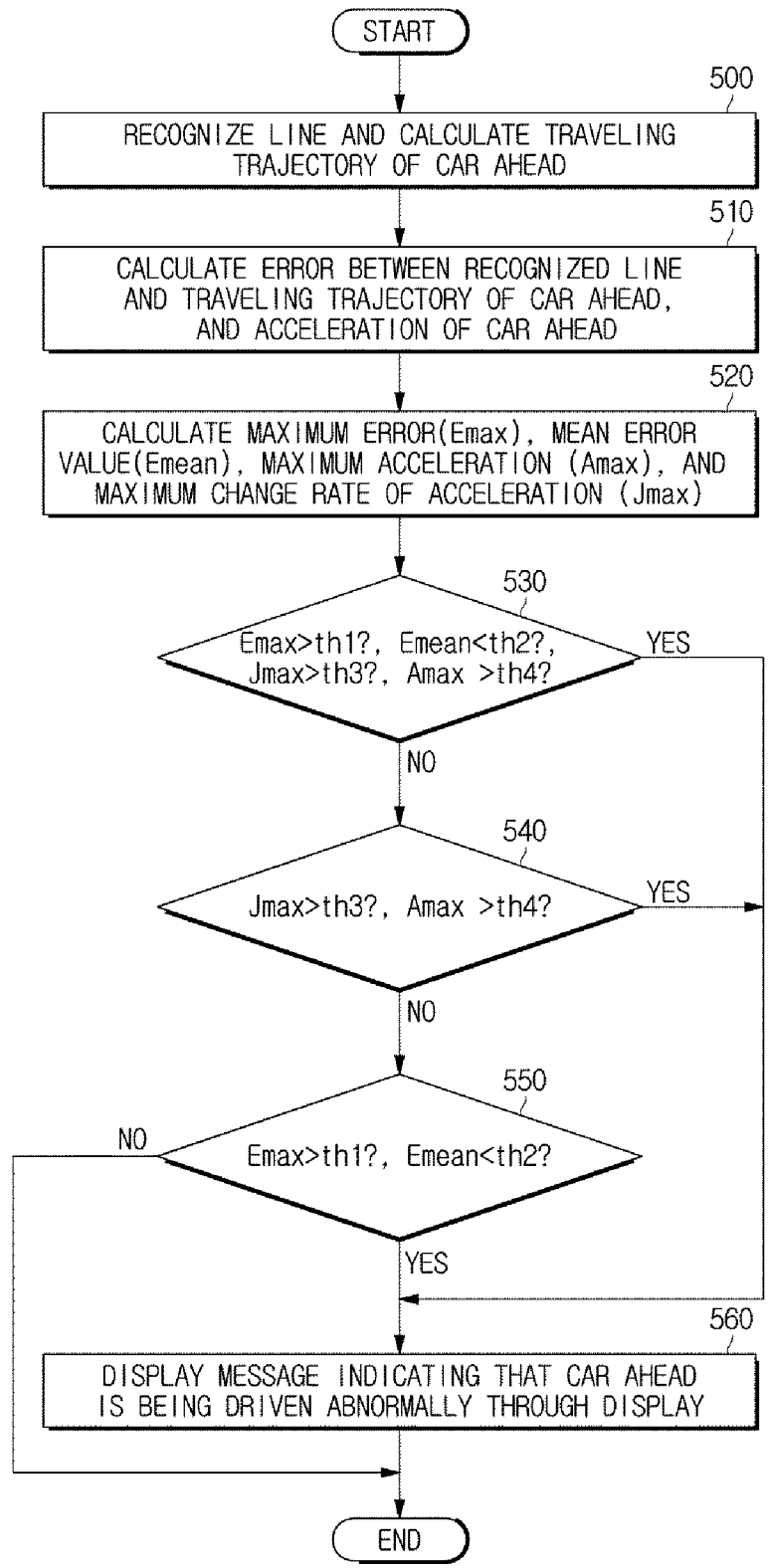

VEHICLE AND METHOD FOR CONTROLLING THE SAME

CROSS-REFERENCE TO RELATED APPLICATION(S)

This application claims the benefit under 35 U.S.C. §119 (a) of Korean Patent Application No. 10-2015-0123001, filed on Aug. 31, 2015, the entire disclosures of which are incorporated hereby incorporated by reference.

FIELD

The present disclosure relates to vehicles.

BACKGROUND

The statements in this section merely provide background information related to the present disclosure and may not constitute prior art.

Driving support devices generally provide a function such as Adaptive Cruise Control (ACC) to support driving in the longitudinal direction, or a function such as a Lane Departure Warning System (LDWS) or Lane Keeping Assist System (LKAS) to support driving in the lateral direction.

Autonomous vehicles capable of autonomously driving in the longitudinal and lateral directions without intervention of the driver have been being developed these days.

SUMMARY

Forms of the present disclosure provide a vehicle and method for controlling the same, which detects abnormal driving of a car ahead, notifies the driver of the abnormal driving, and increases a distance to the car being driven abnormally or avoids the car.

In one aspect of the present disclosure, a vehicle is provided. The vehicle includes a sensor for obtaining information regarding surroundings of the vehicle; a processor for determining an error between lines and a traveling trajectory of a car ahead, and a change in acceleration of the car ahead, based on the information obtained by the sensor, and determining whether the car ahead is being driven abnormally based on the error and change of acceleration; and a display for displaying a message indicating that the car ahead is being driven abnormally.

The processor may determine that the car ahead is being driven abnormally if the error is greater than a predetermined error.

The processor may further determine that the car ahead is being driven abnormally, if a maximum error is greater than a predetermined first threshold and a mean error value is less than a predetermined second threshold.

The processor may control the vehicle to maintain a predetermined distance or more to the car ahead, if it is determined that the car ahead is being driven abnormally.

The processor may determine that the car ahead is being driven abnormally if a change rate of acceleration of the car ahead is greater than a predetermined change rate.

The processor may determine that the car ahead is being driven abnormally, if a maximum change rate of acceleration is greater than a predetermined third threshold and a maximum acceleration is greater than a predetermined fourth threshold.

The processor may control the vehicle to maintain a predetermined distance or more to the car ahead, if it is determined that the car ahead is being driven abnormally.

The processor may determine that the car ahead is being driven abnormally, if a maximum error is greater than a predetermined first threshold, a mean error value is less than a predetermined second threshold, a maximum change rate of acceleration is greater than a predetermined third threshold, and a maximum acceleration is greater than a predetermined fourth threshold.

The processor may control the vehicle to maintain a predetermined distance or more to the car ahead, or to pass the car ahead, if it is determined that the car ahead is being driven abnormally.

The sensor may comprise at least one of a range sensor for sensing a car ahead or an obstacle, and an image sensor for capturing an image of lines on a road.

The processor may recognize lines on a road based on an image captured by the image sensor, determine a traveling trajectory and acceleration of the car ahead based on the information detected by the range sensor, and determine whether the car ahead is being driven abnormally based on an error between the recognized lines and the traveling trajectory and a change of acceleration of the car ahead.

The vehicle may further include an input unit for receiving an input to enter an autonomous driving mode of the vehicle.

The processor may be configured to determine whether a car ahead is being driven abnormally, upon reception of the input to enter the autonomous driving mode through the input unit.

The processor may further include a memory for storing pre-learned abnormal driving data and normal driving data.

The processor may be configured to determine whether the car ahead is being driven abnormally by comparing information obtained by the sensor and data stored in the memory.

In another aspect of the present disclosure, a method for controlling a vehicle is provided. The method includes determining at least one of an error between lines and a traveling trajectory of a car ahead, and a change in acceleration of the car ahead, using information obtained by a sensor; determining whether the car ahead is being driven abnormally based on at least one of the error and the change in acceleration; and displaying a message indicating that the car ahead is being driven abnormally through a display.

Determining whether the car ahead is being driven normally based on at least one of the error and the change in acceleration may include determining that the car ahead is being driven abnormally, if a maximum error is greater than a predetermined first threshold and a mean error value is less than a predetermined second threshold.

Determining whether the car ahead is being driven normally based on at least one of the error and the change in acceleration may include determining that the car ahead is being driven abnormally, if a maximum change rate of acceleration is greater than a predetermined third threshold and a maximum acceleration is greater than a predetermined fourth threshold.

The method may further include controlling the vehicle to maintain a predetermined distance or more to the car ahead, if it is determined that the car ahead is being driven abnormally.

Determining whether the car ahead is being driven normally based on at least one of the error and the change in acceleration may include determining that the car ahead is being driven abnormally, if a maximum error is greater than a predetermined first threshold, a mean error value is less than a predetermined second threshold, a maximum change rate of acceleration is greater than a predetermined third threshold, and a maximum acceleration is greater than a predetermined fourth threshold.

The method may further include controlling the vehicle to maintain a predetermined distance or more to the car ahead or to pass the car ahead, if it is determined that the car ahead is being driven abnormally.

Other aspects, advantages, and salient features of the disclosure will become apparent to those skilled in the art from the following detailed description, which, taken in conjunction with the annexed drawings, discloses exemplary forms of the disclosure.

DRAWINGS

The above and other features and advantages of the present disclosure will become more apparent by describing in detail exemplary forms thereof with reference to the attached drawings in which:

FIG. 1 an exterior view of a vehicle;

Figure 4:
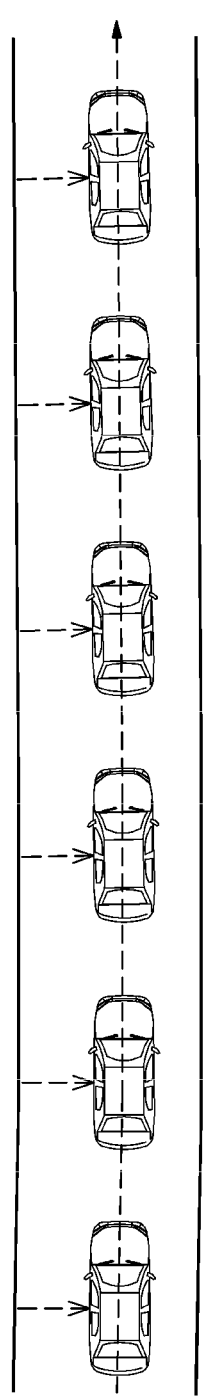
Figure 4:
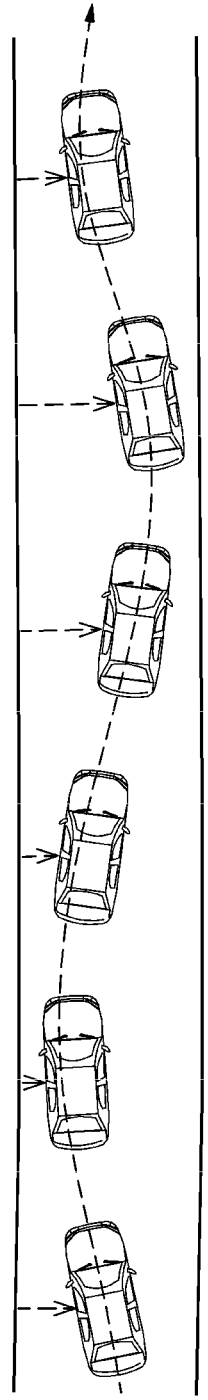

FIG. 4 conceptually illustrates normal and abnormal driving of a vehicle; and FIG. 5 is a flowchart illustrating a method for controlling a vehicle.

Throughout the drawings, like reference numerals will be understood to refer to like parts, components, and structures.

DETAILED DESCRIPTION

Forms of a vehicle and method for controlling the same will now be described in detail with reference to accompanying drawings.

Figure 1:
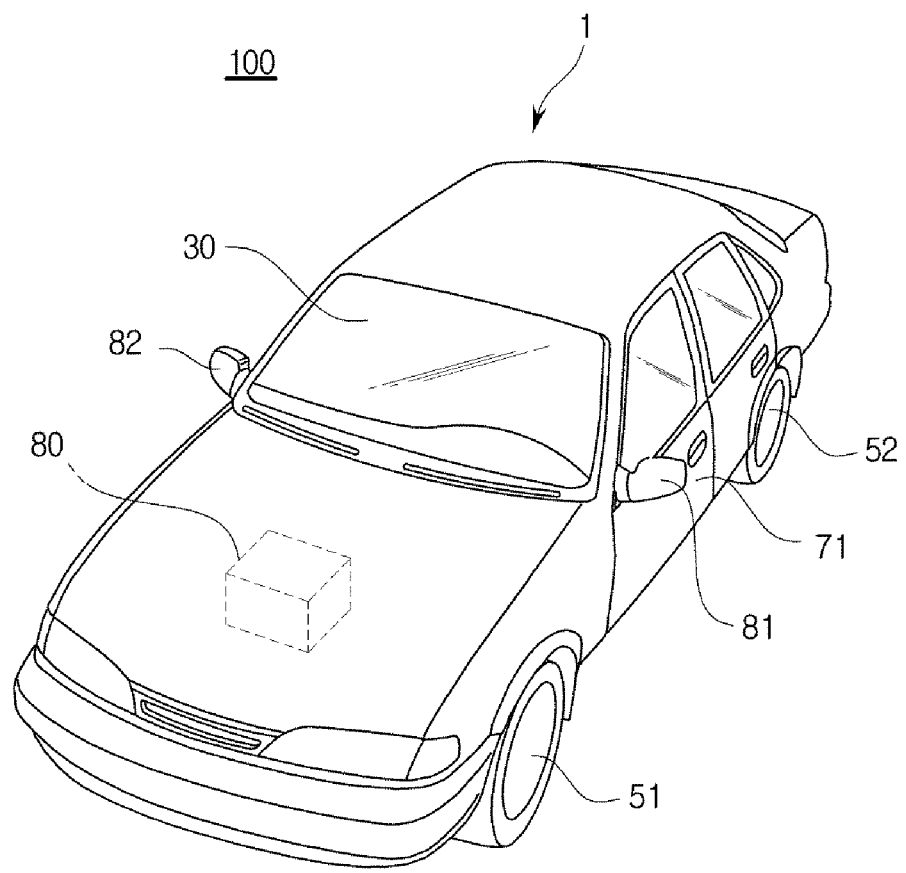
Figure 2:
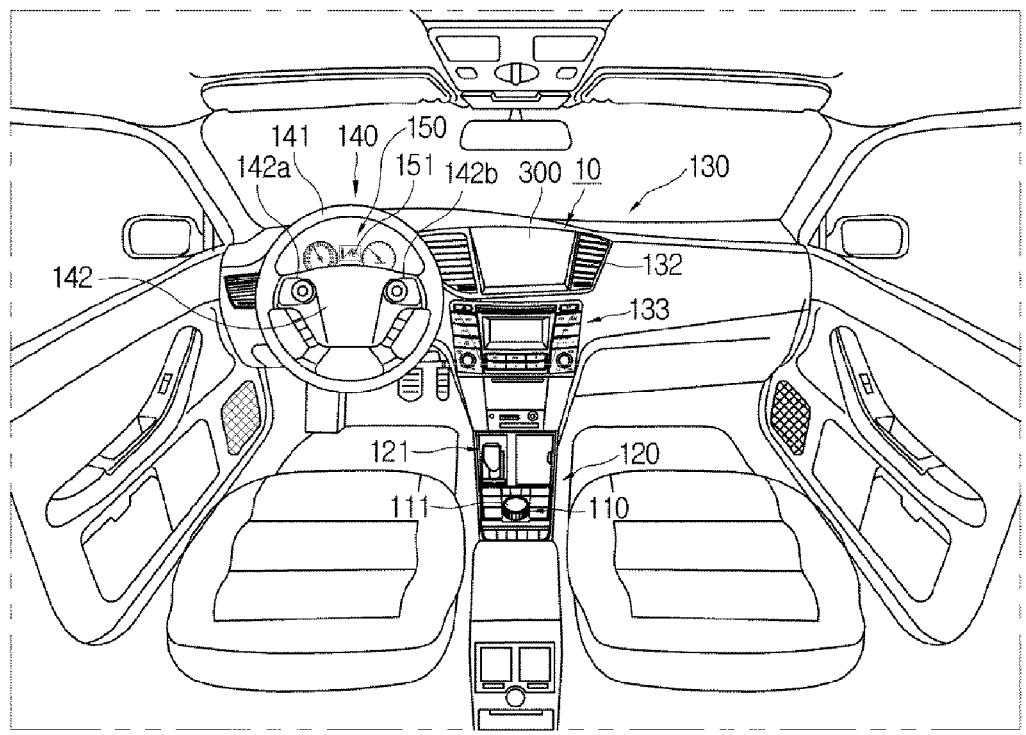
FIG. 2 is an interior view of a vehicle.

FIG. 1 an exterior view of a vehicle, and FIG. 2 is an interior view of a vehicle.

Referring to FIG. 1, a vehicle 100 includes a main body 1 that constitutes the exterior of the vehicle 100, wheels 51 and 52 for moving the vehicle 100, a driving system 80 for rotating the wheels 51 and 52, doors 71 for shielding the interior of the vehicle 100 from the outside, a front window 30 through which the driver can see a view ahead of the vehicle 100, side minors 81 and 82 for helping the driver see areas behind and to the sides of the vehicle 100.

The wheels 51 and 52 include front wheels 51 equipped on the front side of the vehicle 100 and rear wheels 52 equipped on the rear side of the vehicle 100.

The driving system 80 provides turning force to the front or rear wheels 51 or 52 to move the main body 1 forward or backward. The driving system 60 may include a motor that produces the turning force from electrical power supplied from a charging battery (not shown) or a combustion engine (not shown) that burns a fuel to create the turning force.

The doors 71 are attached onto the left and right sides of the main body 1, and opened for entering and exiting the vehicle 100 and closed for shielding the interior of the vehicle 10 from the outside.

The front window 30, also referred to as a windshield glass, is equipped on the upper front of the main body 100. The driver of the vehicle 100 may see a view ahead of the vehicle 100 through the front window 30. The side mirrors 81, 82 include left and right side mirrors 81 and 82 equipped on the left and right sides of the main body 1. The driver of the vehicle 100 may check the situations that are taking place behind the vehicle 100 or on the sides of the vehicle 100 with his or her eyes.

In addition, the vehicle 100 may include various sensors to detect obstacles around the vehicle 100 and help the driver recognize situations around the vehicle 100. The vehicle 100 may further include various sensors to detect information regarding driving (hereinafter, called driving information) of the vehicle, such as the vehicle speed. The vehicle 100 may further include sensors to obtain images of the situations around the vehicle 100 including lines on the road. Such sensors to detect the driving information of the vehicle 100 and situations around the vehicle 100 will be described later.

Referring to FIG. 2, the vehicle 100 may include a gear box 120, a center facia 130, and a dashboard including e.g., a steering wheel 140 and an instrument panel 150.

The gear box 120 includes a gear lever 121 for gear shifting. As shown in FIG. 2, there are a dial 111 enabling the user to control functions of a multimedia system including a navigation system 10 or an audio system 133, or major functions of the vehicle 100, and an input unit 110 having various buttons installed on the gear box 120.

In the center facia 130, an air conditioner 132, the audio system 133, the navigation system 10, etc., may be installed.

The air conditioner 132 keeps the atmosphere inside the vehicle 100 pleasant by controlling temperature, humidity, air cleanness, and air flows inside the vehicle 100. The air conditioner 132 may include at least one vent installed in the center facia 130 for venting air. There may also be buttons or dials installed in the center facia 130 to control e.g., the air conditioner 132. The driver or the user may control the air conditioner 132 with the buttons or dials arranged on the center facia 130. The air conditioner 132 may also be controlled by the dial 111 or buttons of the input unit 110 installed on the gear box 120.

In some forms, the navigation system 10 may be installed in the center facia 130. The navigation system 10 may be embedded in the center facia 130 of the vehicle 100. In one form, an input unit to control the navigation system 10 may be installed in the center facia 130. In another form, the input unit may be installed in a position other than the center facia 130. For example, the input unit for the navigation system 10 may be formed around a display 300 of the navigation system 10. In another example, the input unit for the navigation system 10 may be installed on the gear box 120.

The steering wheel 140 is a tool to control a traveling direction of the vehicle 100, including a rim 141 to be held by the driver and a spoke 142 connected to a steering system of the vehicle 100 for connecting the rim 141 to a hub of a rotation shaft for steering. In a form, control devices 142a, 142b may be formed on the spoke 142 to control various devices, e.g., the audio system. Furthermore, the dashboard may include various instrument panels 150 to indicate to indicate speed, engine rpm, an amount of fuel left, etc. The instrument panel 150 may include an instrument panel display 151 for displaying information regarding vehicle conditions, information regarding driving of the vehicle, information relating to operation of the multimedia system, etc.

The driver may drive the vehicle 100 by controlling the aforementioned various devices equipped in the dashboard. In addition to the driver-controlled devices to drive the vehicle 100, as shown in FIG. 2, the vehicle 100 may further include various sensors to detect information regarding surroundings of the vehicle 100 or driving information of the vehicle 100 itself required for driving of the vehicle 100.

Figure 3:
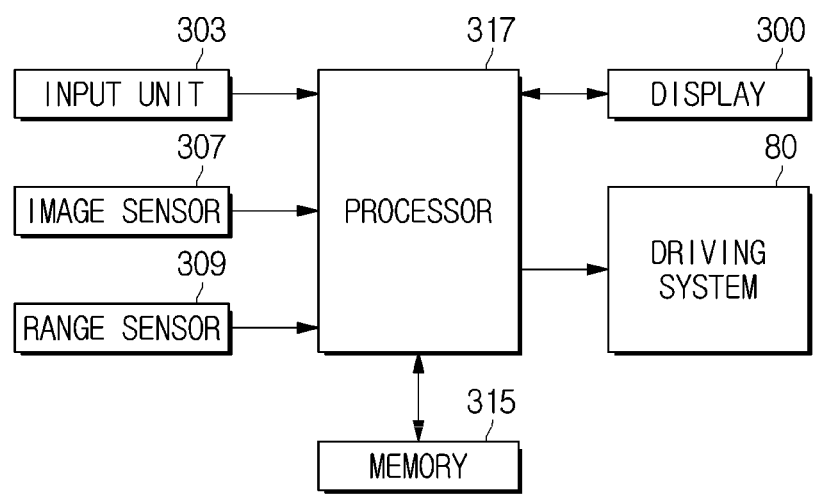
FIG. 3 is a control block diagram of a vehicle.

In accordance with a form of the present disclosure, the vehicle may perform autonomous driving without intervention of the driver based on the information detected by the various sensors. FIG. 3 is a control block diagram of a vehicle, according to a form of the present disclosure, and FIG. 4 conceptually illustrates normal and abnormal driving of a vehicle.

An autonomous driving function provided by a vehicle in accordance with a form of the present disclosure will now be described in more detail in connection with FIGS. 3 and 4.

Referring to FIG. 3, the vehicle may include an input unit 303 for receiving inputs related to an autonomous driving mode, an image sensor 307 for capturing images of surroundings of the vehicle, a range sensor 309 for detecting a car or obstacle ahead, a processor 317 for determining whether a car ahead is driving abnormally based on the information obtained by the image sensor 307 and the range sensor 309, a display 300 for displaying a message notifying the driver of abnormal driving of the car ahead if the processor 317 determines that the car ahead is driving abnormally, and a driving system 80 for driving the vehicle in the autonomous driving mode under the control of the processor 317.

The input unit 303 may be configured to allow the user to enter a command to activate the autonomous driving mode.

The input unit 303 may be formed on the center facia, gear box or steering wheel of the vehicle, and may be implemented in various forms with hard-key typed or soft-key typed buttons, toggle switches, a dial, a voice recognition device, an operation recognition device, etc.

The input unit 303 may receive an input to select one of the autonomous driving mode and a manual driving mode under which the driver has to drive the vehicle by him/herself. Specifically, the driver may select the autonomous driving mode by manipulating the input unit 303 while driving the vehicle in person under the manual driving mode, or may select the manual driving mode while the vehicle is driven in the autonomous driving mode, to drive the vehicle by him/herself. Once switching between the autonomous driving mode and the manual driving mode occurs, the processor 317 may notify the driver of the mode change through the display 300 or a speaker.

In the autonomous driving mode, driving of the vehicle may be influenced by results of detection of e.g., a movement of a car ahead. It is more so when the vehicle is driven following the car. For example, when the vehicle is driven in the autonomous driving mode, if the car ahead is driven in a driving pattern that makes big changes in the lateral direction or abruptly or is frequently accelerated or slowed down (hereinafter, called 'abnormal driving') as shown in (b) of FIG. 4, without being driven normally to be almost parallel to lines of a lane as shown in (a) of FIG. 4, driving safety of the autonomously driving vehicle may be degraded, and even worse, the vehicle might have an accident. For example, if a driver of the car ahead is dozing off behind the wheel or distracted by e.g., a phone call, the car might be abruptly accelerated or slowed down, or be driven in a driving pattern that makes big changes in the lateral direction as shown in (b) of FIG. 4.

In order to deal with the embarrassing situation and to guarantee that a vehicle is stably driven, a vehicle and method for controlling the vehicle is provided in accordance with the present disclosure, that may detect abnormal driving of a car ahead, notify the driver of the abnormal driving, or avoid a risk caused by the car driving abnormally. This will be described below in more detail.

The processor 317 may determine whether a car ahead is driven abnormally based on information from a sensor, once the autonomous driving mode is selected by the driver through the input unit 303. Image information obtained by the image sensor 307, information regarding a car ahead obtained by the range sensor 309, etc., may be used by the processor 317 to determine whether the car ahead is driven abnormally.

The image sensor 307 may obtain an image about surroundings of the vehicle, especially lines of a lane within which the vehicle is driven, and send the image to the processor 317. The image sensor 307 may include at least one of a front camera to capture an image of a view ahead of the vehicle, left and right cameras to capture images of views on the left and right sides of the vehicle, and a rear camera to capture an image of a view behind the vehicle. The cameras may include charge coupled devices (CCDs) or complementary metal-oxide semiconductors (CMOSs).

The range sensor 309 may detect objects outside the vehicle, e.g., cars driving ahead of the vehicle, stationary things including e.g., structures installed around the road, cars approaching to the vehicle from the opposite lane, etc. The range sensor 309 may sense a car C2 ahead in particular, and calculate a distance between the vehicle and the car C2. In a form, the range sensor 309 may include radar or Light detection and Ranging (Lidar).

The processor 317 may determine longitudinally abnormal driving of the car ahead based on changes in acceleration of the car ahead, and determine laterally abnormal driving of the car ahead based on errors between a traveling trajectory and lines of the car ahead. The processor 317 may then finally determine whether the car ahead is driven abnormally based on the determined longitudinally and laterally abnormal driving.

The processor 317 may calculate the speed, acceleration, and change rate of acceleration based on the information detected by the range sensor 309. More specifically, in order to detect whether a car ahead has made acceleration or deceleration, especially abrupt or frequent acceleration or deceleration, the processor 317 may calculate acceleration and change rates of acceleration. The processor 317 may calculate the acceleration of the car ahead (a(k), k=1, ..., n) and change rates of acceleration (jerk(k)=a(k+1)−a(k), k=1, ..., n) based on the information obtained by the range sensor 309 for a predetermined period of time or while the car ahead is moving as far as a predetermined distance.

The processor 317 may calculate maximum acceleration Amax and a maximum change rate of acceleration Jmax for the predetermined period of time or while the car ahead is moving as far as the predetermined distance, and compare the maximum change rate of acceleration and the maximum acceleration with a predetermined third threshold th3 and a predetermined fourth threshold th4, respectively. The maximum acceleration Amax is determined to be a maximum value of absolute acceleration values, and the maximum change rate of acceleration is determined to be a maximum value of absolute change rates of acceleration.

The processor 317 may determine whether the car ahead is being driven abnormally by combining a result of comparing the maximum acceleration and the maximum change rate of acceleration with the fourth threshold and the third threshold, respectively, and a result of comparing errors as will be described later.

The processor 317 detects lines of a lane within which the car ahead is moving based on information obtained by the image sensor 307 in order to calculate an error between the lines and the traveling trajectory of the car ahead. The processor 317 may detect the lines of a lane more precisely using information obtained by the range sensor 309 and map information stored in the navigation system 10 or in the memory 315 in addition to the information obtained by the image sensor 307.

Furthermore, the processor 317 may calculate the traveling trajectory of the car ahead based on information detected by the range sensor 309. Various algorithms known to the public may be used in calculating the traveling trajectory of the car ahead. The processor 317 may calculate the traveling trajectory of the car ahead more precisely using information obtained by the image sensor 307 and map information stored in the navigation system 10 or in the memory 315 in addition to the information obtained by the range sensor 309.

Once the lines of a lane are detected and the traveling trajectory of the car ahead is calculated, the processor 317 may calculate an error between the detected lines and the traveling trajectory of the car ahead. More specifically, the processor 317 may calculate an error (e(k), k=1, . . . , n) between the lines of the lane and the traveling trajectory of the car ahead for the predetermined period of time or while the car ahead is moving as far as the predetermined distance.

The processor 317 may calculate a maximum error Emax and a mean error value Emean for the predetermined period of time or while the car ahead is moving as far as the predetermined distance, and compare the maximum error Emax and the mean error value Emean with a predetermined first threshold th1 and a predetermined second threshold th2, respectively.

The processor 317 may determine whether the car ahead is being driven abnormally by combining a result of comparing the maximum error Emax and the mean error value Emean with the first threshold and the second threshold, respectively, and a result of comparing the aforementioned maximum acceleration Amax and maximum change rate of acceleration Jmax with the fourth and third thresholds, respectively.

The processor 317 may determine that the car ahead is being driven abnormally if the maximum error Emax is greater than the first threshold, the mean error value Emean is less than the second threshold, the maximum change rate of acceleration is greater than the third threshold, and the maximum acceleration is greater than the fourth threshold.

If the maximum error Emax is greater than the first threshold, it may mean that the car ahead is being driven with big changes in the lateral direction. However, in a case that the car ahead is being driven to be lopsided to one of the lines of the lane within which the car ahead is moving, the maximum error Emax may be greater than the first threshold, but it hardly means that the car ahead is being driven with big changes in the lateral direction. In forms of the present disclosure, the latter case is not determined to correspond to the abnormal driving. Driving to be lopsided to a line leads to a greater mean error value, so in order not to determine this case to be a case of abnormal driving, it is further determined whether the mean error value Emean is less than the second threshold value. The second threshold is to detect driving with big changes in the lateral direction, and may be determined in advance by an experiment.

If the maximum change rate of acceleration is greater than the third threshold and the maximum acceleration is greater than the fourth threshold, it may mean that the car ahead is making sudden acceleration or deceleration while being driven.

Accordingly, the processor 317 may determine that the car ahead is being abnormally driven not only in the lateral direction but also in the longitudinal direction, if the maximum error Emax is greater than the first threshold, the mean error value Emean is less than the second threshold, the maximum change rate of acceleration is greater than the third threshold, and the maximum acceleration is greater than the fourth threshold.

Once it is determined that the car ahead is being abnormally driven, the display 300 displays a message indicating that the car ahead is being driven abnormally to notify the driver. The message may be implemented in any combination of text, an image, sound, etc. The display 300 may correspond to the display 300 of the navigation system 10 or the display 151 of the instrument panel.

As described above, if the car ahead is being abnormally driven in both of the lateral and longitudinal directions, the processor 317 may determine that the level of abnormal driving of the car ahead is high and dangerous. Accordingly, as described above, the processor 317 may notify the driver of the abnormal driving through the display 300, and control the driving system 80 to secure a safety distance by increasing the distance to the car ahead or to pass the car ahead. The driving system 80 as used herein is not only limited to an engine or motor, but may include all the components to be controlled in autonomous driving of the vehicle.

When the condition that the maximum error is greater than the first threshold, the mean error value is less than the second threshold, the maximum change rate of acceleration is greater than the third threshold, and the maximum acceleration is greater than the fourth threshold is not met, the processor 317 may determine whether the maximum change rate of acceleration is greater than the third threshold and the maximum acceleration is greater than the fourth threshold.

The processor 317 may determine that the car ahead is being driven abnormally if the maximum change rate of acceleration is greater than the third threshold, and the maximum acceleration is greater than the fourth threshold. As described above, if the maximum change rate of acceleration is greater than the third threshold and the maximum acceleration is greater than the fourth threshold, it may mean that the car ahead is making sudden acceleration or deceleration while being driven. That is, the processor 317 may determine that the car ahead is being abnormally driven in the longitudinal direction.

Once it is determined that the car ahead is being abnormally driven, the display 300 displays a message indicating that the car ahead is being driven abnormally to notify the driver. The message may be implemented in any combination of text, an image, sound, etc.

When the car ahead is being abnormally driven in the longitudinal direction, the processor 317 may determine that the level of abnormal driving of the car ahead is less dangerous than in the case that the car ahead is abnormally driven in both of the longitudinal and lateral directions, as described above. Accordingly, as described above, the processor 317 may notify the driver of the abnormal driving through the display 300, and control the driving system 80 to secure a safety distance by increasing the distance to the car ahead. In another example, similar to the case where the car ahead is being abnormally driven in the longitudinal and lateral directions, the processor may control the driving system 80 to pass the car ahead.

If a condition that the maximum change rate of acceleration is greater than the third threshold and the maximum acceleration is greater than the fourth threshold is not met, the processor 317 may determine whether the maximum error Emax is greater than the first threshold and the mean error value Emean is less than the second threshold.

If the maximum error Emax is greater than the first threshold and the mean error value Emean is less than the second threshold, the processor 317 may determine that the car head is being driven abnormally. As described above, if the maximum error Emax is greater than the first threshold and the mean error value Emean is less than the second threshold, it may mean that the car ahead is being driven with big changes in the lateral direction. That is, the processor 317 may determine that the car ahead is being abnormally driven in the lateral direction.

Once it is determined that the car ahead is being abnormally driven, the display 300 displays a message indicating that the car ahead is being driven abnormally to notify the driver. The message may be implemented in any combination of text, an image, sound, etc.

When the car ahead is being abnormally driven in the lateral direction, the processor 317 may determine that the level of abnormal driving of the car ahead is less dangerous than in the case that the car ahead is abnormally driven in both of the longitudinal and lateral directions, as described above. Accordingly, as described above, the processor 317 may notify the driver of the abnormal driving through the display 300, and control the driving system 80 to secure a safety distance by increasing the distance to the car ahead. In another example, similar to the case where the car ahead is being abnormally driven in the longitudinal and lateral directions, the processor may control the driving system 80 to pass the car ahead.

As described above, the process of comparing the maximum acceleration and maximum change rate of acceleration with the fourth and third thresholds, respectively, may be performed before the process of comparing the maximum error Emax and mean error value Emean with the first and second thresholds, respectively, or alternatively, the latter process may be performed before the former process.

Whether a car ahead is being driven abnormally may be determined with the aforementioned processes, or based on some mechanical training. Specifically, the memory 315 may store normal and abnormal driving patterns, which have been learned using traveling trajectories, recognized lines, and acceleration and deceleration information appearing in normal and abnormal driving of a car ahead, and the processor 317 may determine whether the car ahead is being driven abnormally by comparing a trajectory, recognized lines, and acceleration and deceleration information obtained for a predetermined period of time or while the car ahead is moving as far as a predetermined distance with the learned data stored in the memory 315. The memory 315 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), Electrically Erasable Programmable ROMs (EEPROMs), or the like.

FIG. 5 is a flowchart illustrating a method for controlling a vehicle, according to a form of the present disclosure.

Referring to FIG. 5, to determine whether a car ahead is being driven abnormally, the processor 317 recognizes lines of a lane within which the car ahead is being driven and calculates a traveling trajectory of the car ahead, in operation 500, and calculates an error between the recognized lines and the traveling trajectory of the car ahead, and acceleration of the car ahead, in operation 510. The processor 317 calculates a maximum error and mean error value, and maximum acceleration and maximum change rate of acceleration, in operation 520.

The processor 317 may determine longitudinally abnormal driving of the car ahead based on changes in acceleration of the car ahead, and determine laterally abnormal driving of the car ahead based on errors between a traveling trajectory and lines of the car ahead. The processor 317 may then finally determine whether the car ahead is driven abnormally based on whether the car ahead is being abnormally driven in the longitudinal and lateral directions.

The processor 317 may detect lines of a lane within which the car ahead is moving based on information obtained by the image sensor 307 in order to calculate an error between the lines and the traveling trajectory of the car ahead. The processor 317 may detect the lines of a lane more precisely using information obtained by the range sensor 309 and map information stored in the navigation system 10 or in the memory 315 in addition to the information obtained by the image sensor 307.

Furthermore, the processor 317 may calculate the traveling trajectory of the car ahead based on information detected by the range sensor 309. Various algorithms known to the public may be used in calculating the traveling trajectory of the car ahead. The processor 317 may calculate the traveling trajectory of the car ahead more precisely using information obtained by the image sensor 307 and map information stored in the navigation system 10 or in the memory 315 in addition to the information obtained by the range sensor 309.

Once the lines of the lane are detected and the traveling trajectory of the car ahead is calculated, the processor 317 may calculate an error between the detected lines and the traveling trajectory of the car ahead. More specifically, the processor 317 may calculate an error (e(k), k=1, . . . , n) between the lines of the lane and the traveling trajectory of the car ahead for a predetermined period of time or while the car ahead is moving as far as a predetermined distance.

The processor 317 may calculate a maximum error Emax and a mean error value Emean for the predetermined period of time or while the car ahead is moving as far as the predetermined distance.

Furthermore, the processor 317 may calculate the speed, acceleration, and change rates of acceleration of the car ahead based on the information detected by the range sensor 309. More specifically, in order to detect whether a car ahead has made acceleration or deceleration, especially sudden or frequent acceleration or deceleration, the processor 317 may calculate acceleration and change rates of acceleration. The processor 317 may calculate the acceleration of the car ahead (a(k), k=1, . . . , n) and change rates of acceleration (jerk(k)=a(k+1)−a(k), k=1, . . . , n) based on the information obtained by the range sensor 309 for a predetermined period of time or while the car ahead is moving as far as a predetermined distance.

The processor 317 may calculate maximum acceleration Amax and a maximum change rate of acceleration for the predetermined period of time or while the car ahead is moving as far as the predetermined distance. The maximum acceleration Amax is determined to be a maximum value of absolute acceleration values, and the maximum change rate of acceleration is determined to be a maximum value of absolute change rates of acceleration.

The processor 317 may determine whether the maximum error Emax is greater than a predetermined first threshold value th1, whether the mean error value Emean is less than a predetermined second threshold value th2, whether the maximum change rate of acceleration Jmax is greater than a predetermined third threshold value th3, and whether the maximum acceleration Amax is greater than a predetermined fourth threshold value th4, in operation 530. If the condition is met, the processor 317 displays a message indicating that the car ahead is being driven abnormally through the display 300, in operation 560.

The processor 317 may determine whether the car ahead is being driven abnormally by combining a result of comparing the maximum error Emax and the mean error value Emean with the first threshold and the second threshold, respectively, and a result of comparing the aforementioned maximum acceleration Amax and maximum change rate of acceleration Jmax with the fourth and third thresholds, respectively.

The processor 317 may determine that the car ahead is being driven abnormally if the maximum error Emax is greater than the first threshold, the mean error value Emean is less than the second threshold, the maximum change rate of acceleration is greater than the third threshold, and the maximum acceleration is greater than the fourth threshold.

If the maximum error Emax is greater than the first threshold, it may mean that the car ahead is being driven with big changes in the lateral direction. However, in a case that the car ahead is being driven to be lopsided to one of the lines of the lane within which the car ahead is moving, the maximum error Emax may be greater than the first threshold, but it hardly means that the car ahead is being driven with big changes in the lateral direction. In the forms of the present disclosure, the latter case is not determined to correspond to the abnormal driving. Driving to be lopsided to a line leads to a greater mean error value, so in order not to determine this case to be a case of abnormal driving, it is further determined whether the mean error value Emean is less than the second threshold value. The second threshold is to detect driving with big changes in the lateral direction, and may be determined in advance by an experiment.

If the maximum change rate of acceleration is greater than the third threshold and the maximum acceleration is greater than the fourth threshold, it may mean that the car ahead is being driven, making sudden acceleration or deceleration.

Accordingly, the processor 317 may determine that the car ahead is being abnormally driven not only in the lateral direction but also in the longitudinal direction, if the maximum error Emax is greater than the first threshold, the mean error value Emean is less than the second threshold, the maximum change rate of acceleration is greater than the third threshold, and the maximum acceleration is greater than the fourth threshold.

Once it is determined that the car ahead is being abnormally driven, the display 300 displays a message indicating that the car ahead is being driven abnormally to notify the driver. The message may be implemented in any combination of text, an image, sound, etc.

As described above, if the car ahead is being abnormally driven in both of the lateral and longitudinal directions, the processor 317 may determine that the level of abnormal driving of the car ahead is high and dangerous. Accordingly, as described above, the processor 317 may notify the driver of the abnormal driving through the display 300, and control the driving system 80 to secure a safety distance by increasing the distance to the car ahead or to pass the car ahead.

If the maximum error, mean error value, maximum change rate of acceleration, and maximum acceleration do not satisfy the condition of operation 530, the processor 317 determines whether the maximum change rate of acceleration is greater than the third threshold th3 and whether the maximum acceleration is greater than the fourth threshold th4, in operation 540. If the condition of operation 540 is met, the processor 317 displays a message indicating that the car ahead is being driven abnormally through the display 300, in operation 560.

When the condition that the maximum error is greater than the first threshold, the mean error value is less than the second threshold, the maximum change rate of acceleration is greater than the third threshold, and the maximum acceleration is greater than the fourth threshold is not met, the processor 317 may determine whether the maximum change rate of acceleration is greater than the third threshold and the maximum acceleration is greater than the fourth threshold.

The processor 317 may determine that the car ahead is being driven abnormally, if the maximum change rate of acceleration is greater than the third threshold and the maximum acceleration is greater than the fourth threshold. As described above, if the maximum change rate of acceleration is greater than the third threshold and the maximum acceleration is greater than the fourth threshold, it may mean that the car ahead is being driven, making sudden acceleration or deceleration. That is, the processor 317 may determine that the car ahead is being abnormally driven in the longitudinal direction.

Once it is determined that the car ahead is being abnormally driven, the display 300 displays a message indicating that the car ahead is being driven abnormally to notify the driver. The message may be implemented in any combination of text, an image, sound, etc.

When the car ahead is being abnormally driven in the longitudinal direction, the processor 317 may determine that the level of abnormal driving of the car ahead is less dangerous than in the case that the car ahead is abnormally driven in both of the longitudinal and lateral directions, as described above. Accordingly, as described above, the processor 317 may notify the driver of the abnormal driving through the display 300, and further control the driving system 80 to secure a safety distance by increasing the distance to the car ahead. In another example, similar to the case where the car ahead is being abnormally driven in the longitudinal and lateral directions, the processor may control the driving system 80 to pass the car ahead.

If the maximum change rate of acceleration and maximum acceleration do not satisfy the condition of operation 540, the processor 317 determines whether the maximum error is greater than the first threshold th1 and whether the mean error value is less than the second threshold th2, in operation 550. If the condition of operation 550 is met, the processor 317 displays a message indicating that the car ahead is being driven abnormally through the display 300, in operation 560.

If a condition that the maximum change rate of acceleration is greater than the third threshold and the maximum acceleration is greater than the fourth threshold is not met, the processor 317 may determine whether the maximum error Emax is greater than the first threshold and the mean error value Emean is less than the second threshold.

If the maximum error Emax is greater than the first threshold and the mean error value Emean is less than the second threshold, the processor 317 may determine that the car head is being driven abnormally. As described above, if the maximum error Emax is greater than the first threshold and the mean error value Emean is less than the second threshold, it may mean that the car ahead is being driven with big changes in the lateral direction. That is, the processor 317 may determine that the car ahead is being abnormally driven in the lateral direction.

Once it is determined that the car ahead is being abnormally driven, the display 300 displays a message indicating that the car ahead is being driven abnormally to notify the driver. The message may be implemented in any combination of text, an image, sound, etc.

When the car ahead is being abnormally driven in the lateral direction, the processor 317 may determine that the level of abnormal driving of the car ahead is less dangerous than in the case that the car ahead is abnormally driven in both of the longitudinal and lateral directions, as described above. Accordingly, as described above, the processor 317 may notify the driver of the abnormal driving through the display 300, and further control the driving system 80 to secure a safety distance by increasing the distance to the car ahead. In another example, similar to the case where the car ahead is being abnormally driven in the longitudinal and lateral directions, the processor may control the driving system 80 to pass the car ahead.

As described above, the process of comparing the maximum acceleration and maximum change rate of acceleration with the fourth and third thresholds, respectively, may be performed before the process of comparing the maximum error Emax and mean error value Emean with the first and second thresholds, respectively, or alternatively, the latter process may be performed before the former process.

According to forms of the present disclosure, abnormal driving of a car ahead may be determined.

The abnormal driving of the car ahead may be notified to the driver, thereby increasing driving safety.

Moreover, when the car ahead is being driven abnormally, stability of the vehicle may be improved by increasing a distance to the car ahead or avoiding the car ahead.

Several forms have been described, but a person of ordinary skill in the art will understand and appreciate that various modifications can be made without departing the scope of the present disclosure. Thus, it will be apparent to those ordinary skilled in the art that the disclosure is not limited to the forms described, which have been provided only for illustrative purposes.

What is claimed is:

1. A vehicle comprising:
    a sensor configured to obtain information regarding surroundings of the vehicle by comprising at least one of:
        a range sensor configured to sense a car or obstacle ahead of the vehicle, or
        an image sensor configured to capture an image of lines in a road;
    a processor configured to:
        determine an error between the lines in the road and a traveling trajectory of a car ahead of the vehicle, and a change in acceleration of the car ahead of the vehicle, based on the information obtained by the sensor;
        recognize the lines in the road based on the image captured by the image sensor;
        determine a traveling trajectory and acceleration of the car ahead of the vehicle based on the car or obstacle sensed by the range sensor; and
        determine whether the car ahead of the vehicle is being driven abnormally based on an error between the recognized lines in the road and the traveling trajectory and a change of acceleration of the car ahead of the vehicle;
        determine that the car ahead of the vehicle is being driven abnormally when a maximum error is greater than a predetermined first threshold and a mean error value is less than a predetermined second threshold; and
    a display configured to display a message indicating that the car ahead is being driven abnormally.

2. The vehicle of claim 1, wherein the processor is configured to determine that the car ahead of the vehicle is being driven abnormally if the error is greater than a predetermined error.

3. The vehicle of claim 2, wherein the processor is configured to control the vehicle to maintain a predetermined distance or more to the car ahead of the vehicle, when it is determined that the car ahead of the vehicle is being driven abnormally.

4. The vehicle of claim 1, wherein the processor is configured to determine that the car ahead of the vehicle is being driven abnormally if a change rate of acceleration of the car ahead of the vehicle is greater than a predetermined change rate.

5. The vehicle of claim 4, wherein the processor is configured to control the vehicle to maintain a predetermined distance or more to the car ahead of the vehicle, when it is determined that the car ahead of the vehicle is being driven abnormally.

6. The vehicle of claim 1, wherein the processor is configured to determine that the car ahead of the vehicle is being driven abnormally, if a maximum change rate of acceleration is greater than a predetermined third threshold and a maximum acceleration is greater than a predetermined fourth threshold.

7. The vehicle of claim 1, wherein the processor is configured to determine that the car ahead of the vehicle is being driven abnormally, if a maximum error is greater than a predetermined first threshold, a mean error value is less than a predetermined second threshold, a maximum change rate of acceleration is greater than a predetermined third threshold, and a maximum acceleration is greater than a predetermined fourth threshold.

8. The vehicle of claim 7, wherein the processor is configured to control the vehicle to maintain a predetermined distance or more to the car ahead of the vehicle or to pass the car ahead of the vehicle, if it is determined that the car ahead of the vehicle is being driven abnormally.

9. The vehicle of claim 1, further comprising: an input unit configured to receive an input to enter an autonomous driving mode of the vehicle.

10. The vehicle of claim 1, wherein the processor is configured to determine whether a car ahead of the vehicle is being driven abnormally, upon reception of the input to enter the autonomous driving mode through the input unit.

11. The vehicle of claim 1, further comprising: a memory configured to store pre-learned abnormal driving data and normal driving data.

12. The vehicle of claim 11, wherein the processor is configured to determine whether the car ahead of the vehicle is being driven abnormally by comparing information obtained by the sensor and data stored in the memory.

13. A method for controlling a vehicle, comprising:
    determining at least one of an error between lines and a traveling trajectory of a car ahead of the vehicle, and a change in acceleration of the car ahead of the vehicle, using information obtained by a sensor;
    determining whether the car ahead of the vehicle is being driven abnormally based on at least one of the error and the change in acceleration; and
    displaying a message indicating that the car ahead is being driven abnormally through a display, wherein determining whether the car ahead of the vehicle is being driven normally comprises:
    determining that the car ahead of the vehicle is being driven abnormally when a maximum error is greater than a predetermined first threshold and a mean error value is less than a predetermined second threshold.

14. The method of claim 13, wherein determining whether the car ahead of the vehicle is being driven normally based on at least one of the error and the change in acceleration comprises:

determining that the car ahead is being driven abnormally, when a maximum change rate of acceleration is greater than a predetermined third threshold and a maximum acceleration is greater than a predetermined fourth threshold.

15. The method of claim 13, further comprising: controlling the vehicle to maintain a predetermined distance or more to the car ahead of the vehicle, when it is determined that the car ahead of the vehicle is being driven abnormally.

16. The method of claim 13, wherein determining whether the car ahead of the vehicle is being driven normally comprises:

determining that the car ahead of the vehicle is being driven abnormally, when a maximum error is greater than a predetermined first threshold, a mean error value is less than a predetermined second threshold, a maximum change rate of acceleration is greater than a predetermined third threshold, and a maximum acceleration is greater than a predetermined fourth threshold.

17. The method of claim 16, further comprising: controlling the vehicle to maintain a predetermined distance or more to the car ahead of the vehicle or to pass the car ahead of the vehicle, when it is determined that the car ahead of the vehicle is being driven abnormally.

* * * * *